Aug. 17, 1965  R. S. RANDALL  3,200,560
MACHINE FOR VACUUM SEALING BAGS
Filed Sept. 29, 1960  6 Sheets-Sheet 2
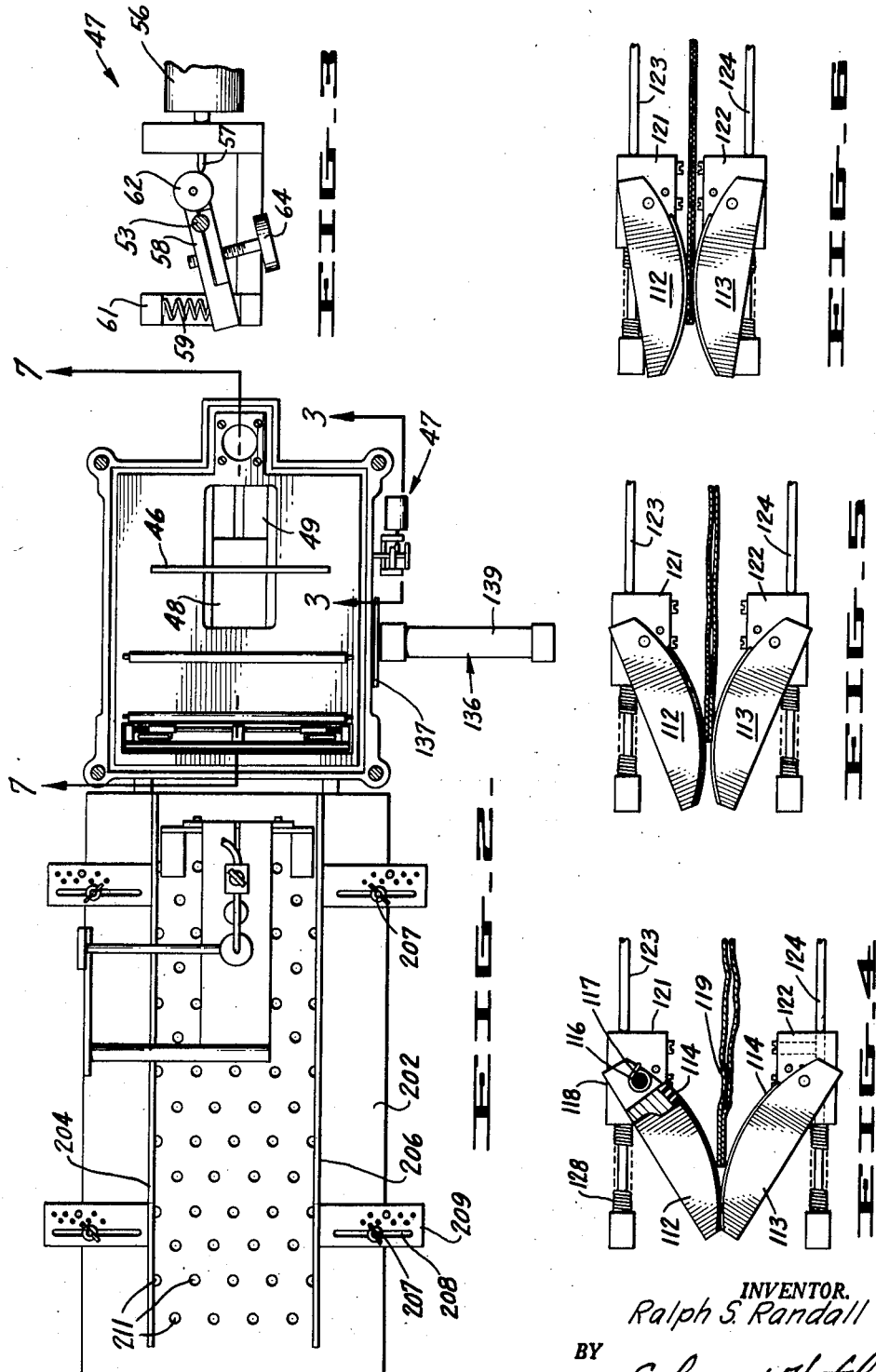
INVENTOR.
Ralph S. Randall
BY
Schapp & Hatch
ATTORNEYS.

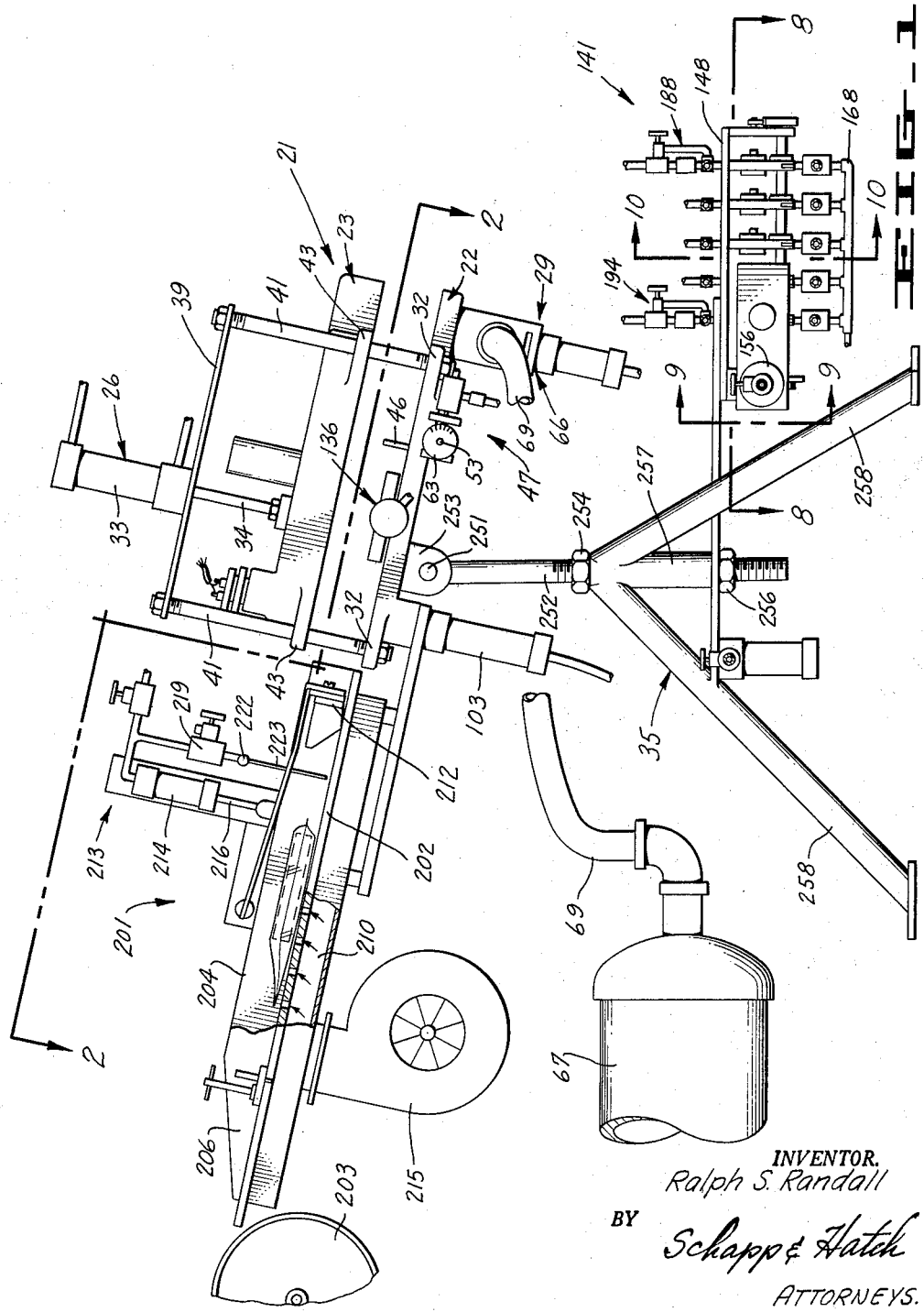

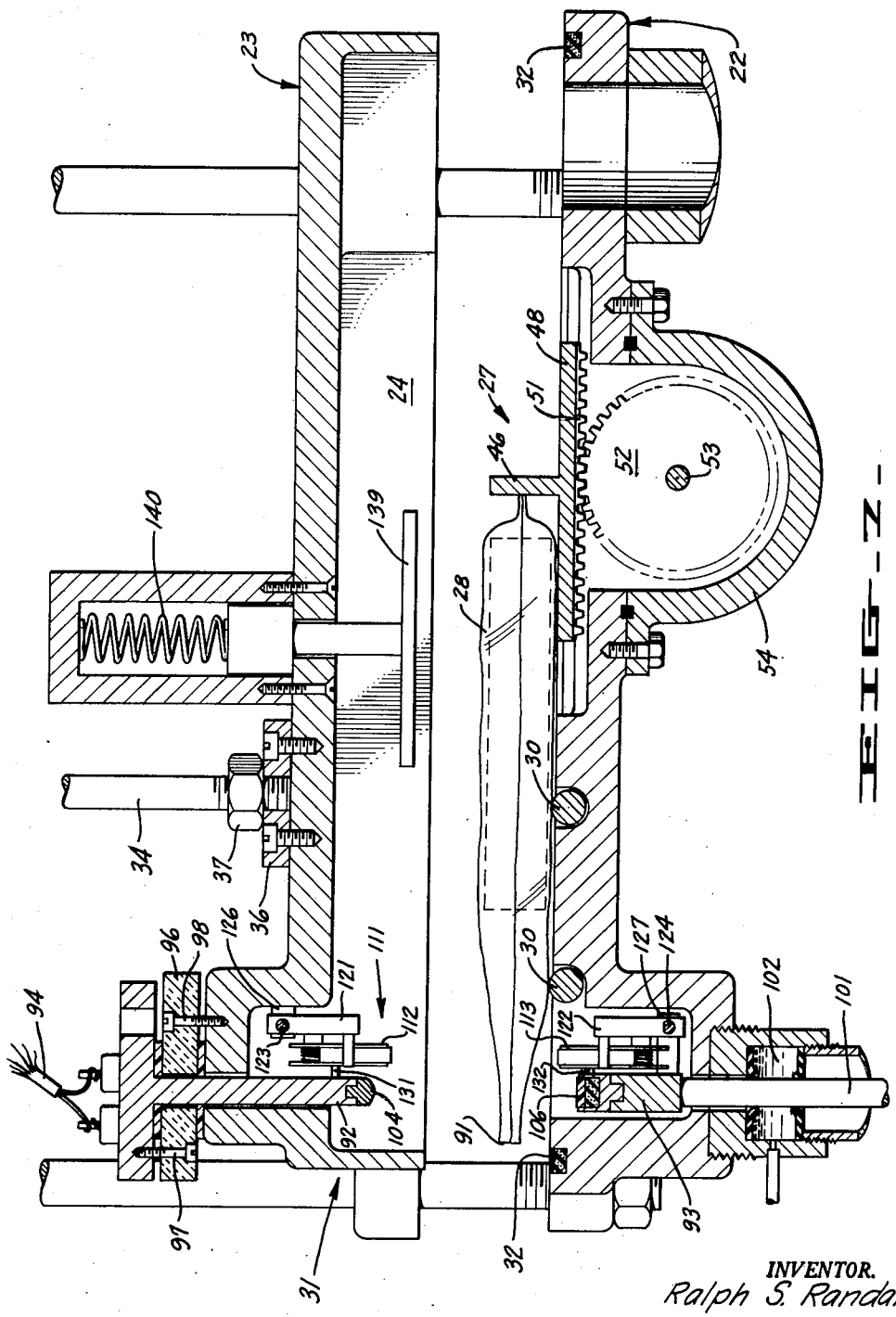

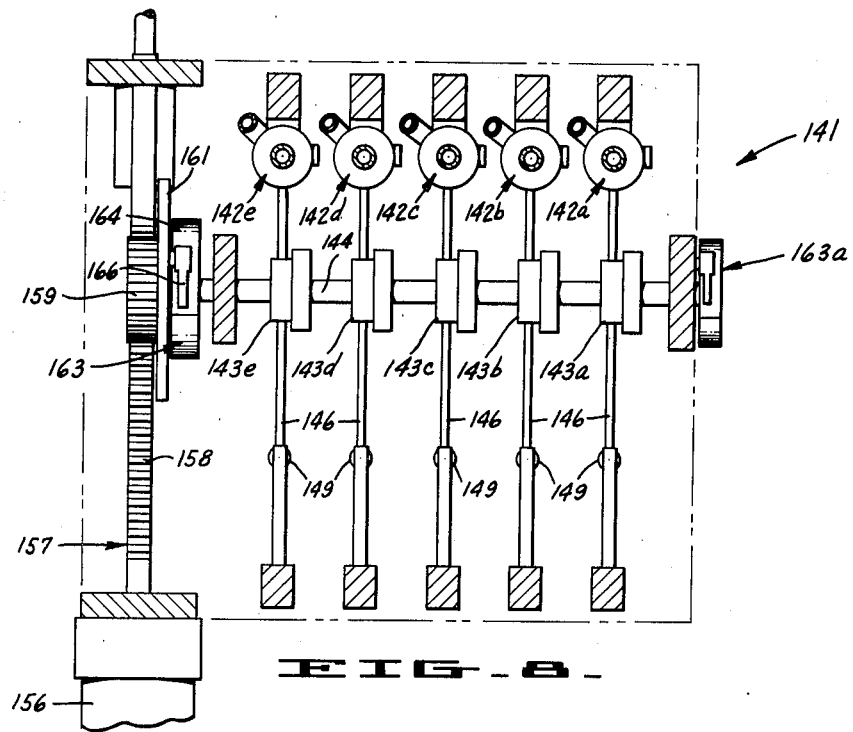
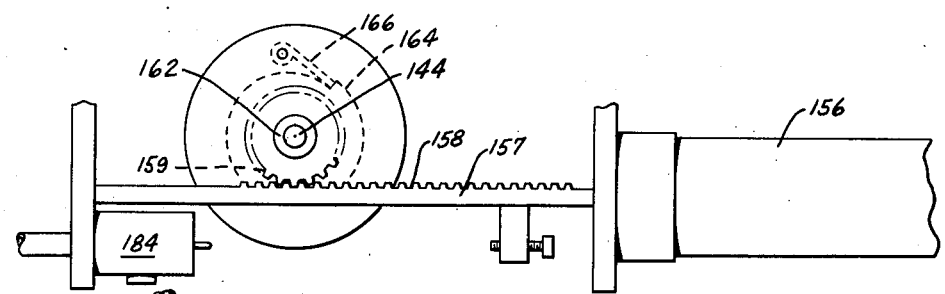
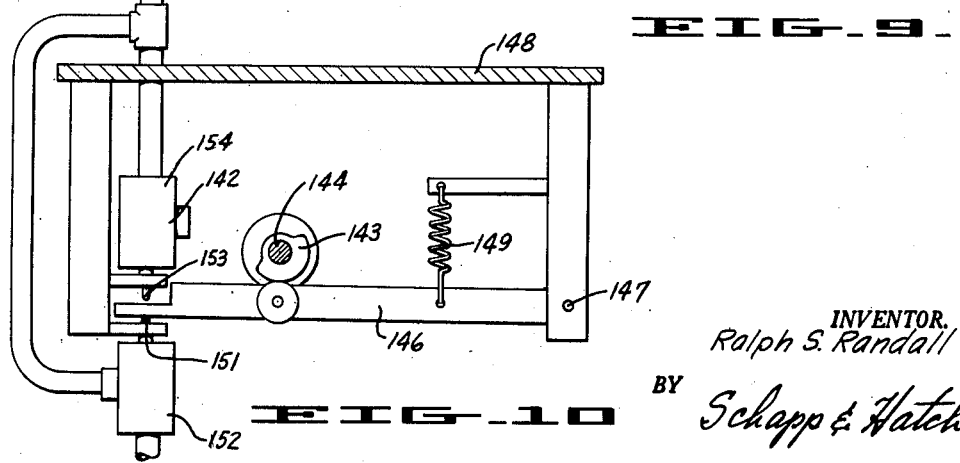

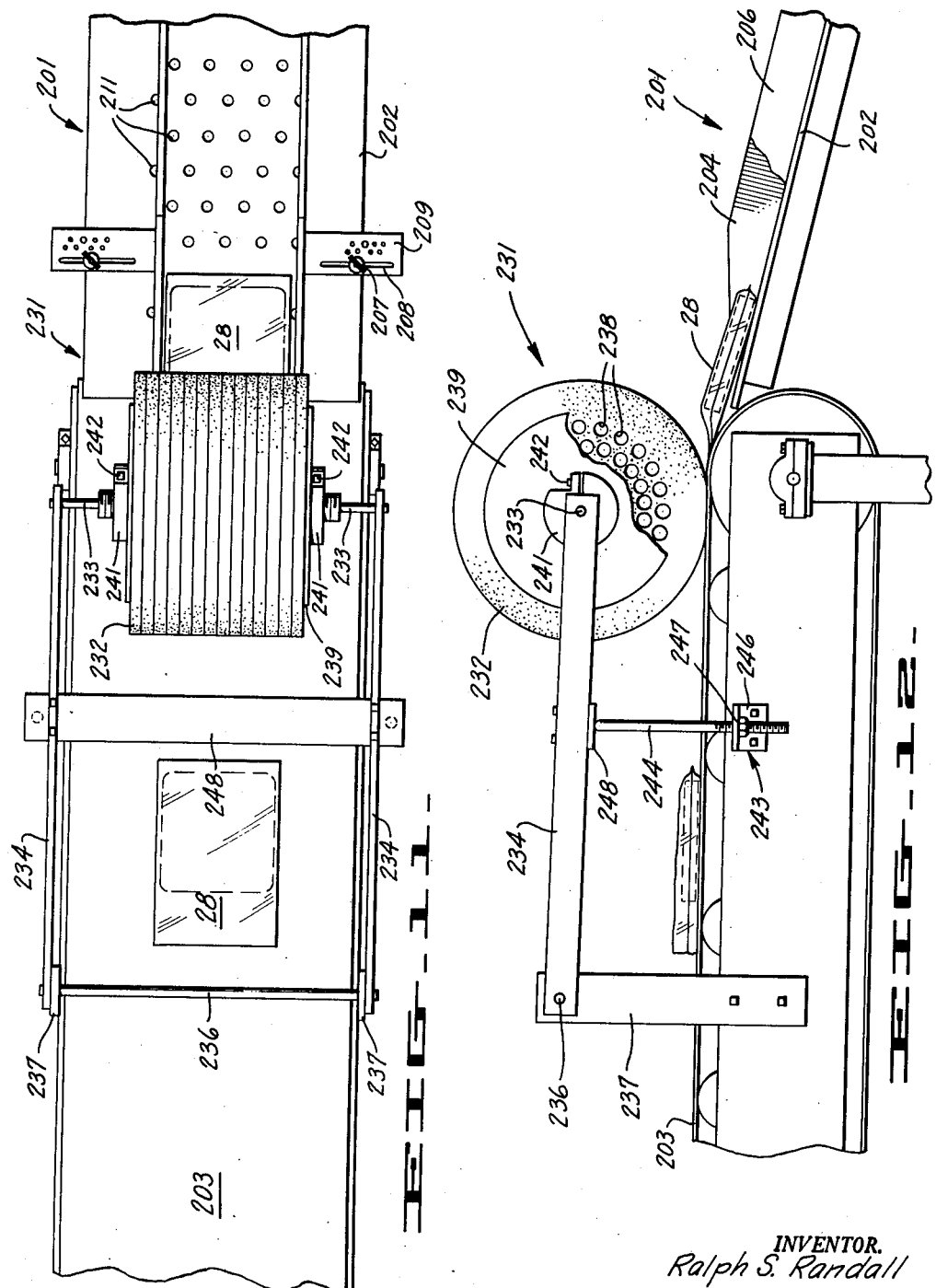

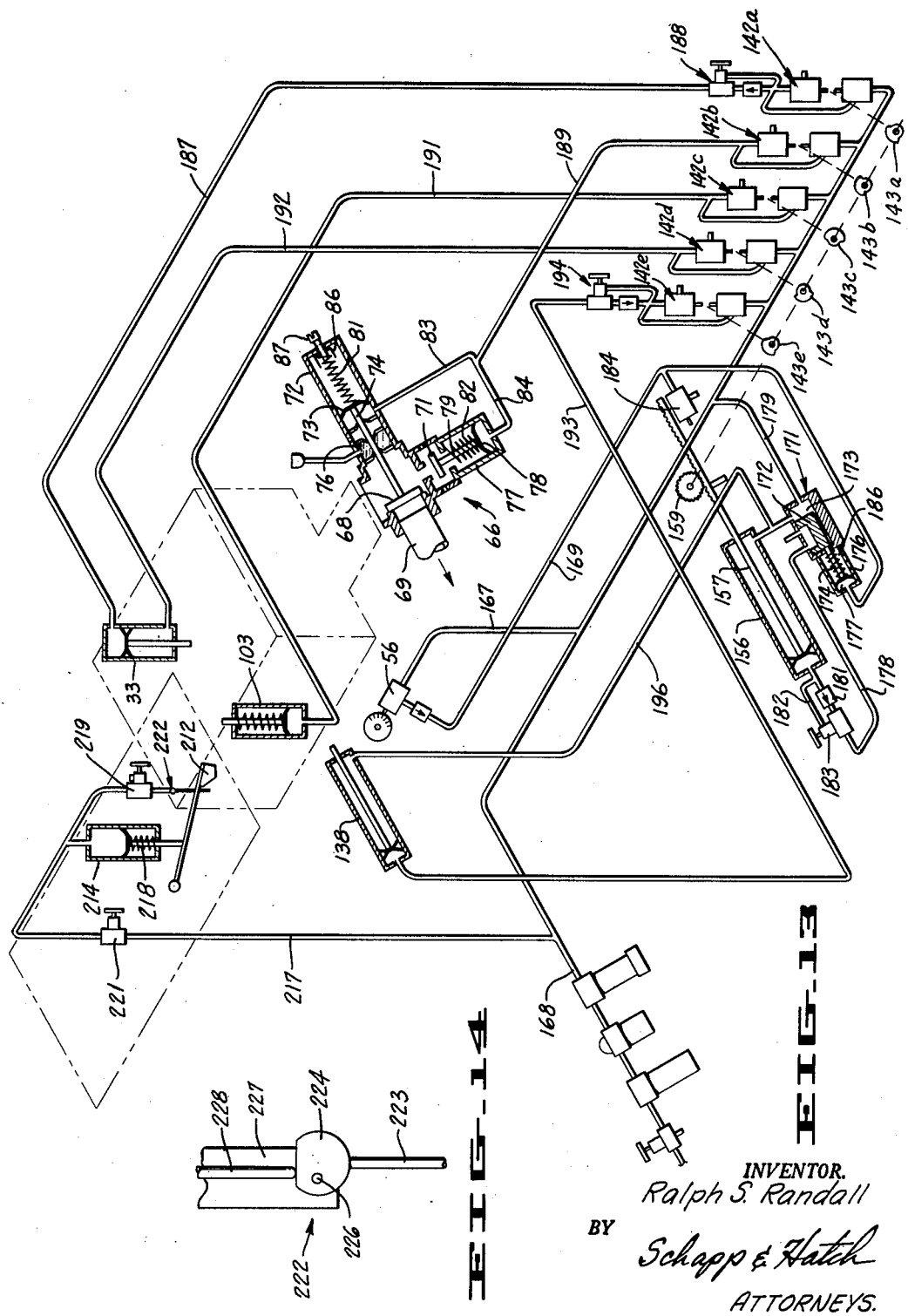

United States Patent Office 3,200,560
Patented Aug. 17, 1965

3,200,560
MACHINE FOR VACUUM SEALING BAGS
Ralph S. Randall, 3380 20th St., San Francisco, Calif.
Filed Sept. 29, 1960, Ser. No. 59,399
11 Claims. (Cl. 53—86)

This invention relates to improvements in a machine for vacuum sealing bags and more particularly to apparatus for evacuating atmospheric air from a pouch or bag containing a product and thereafter hermetically sealing the pouch or bag at any desired subatmospheric internal pressure.

Modern merchandising methods have resulted in an enormous increase in the use of prepackaged perishable products such as luncheon meat and the like. Improved preservation of such products is accomplished by preventing the atmosphere from contacting the product through the medium of hermetically sealing the package.

Such sealing of the package is made practical by the widespread use of air-impervious packaging materials. The bags or pouches may be made of plastics possessing the required properties or may be made of other materials coated or otherwise associated with such plastics. Secure hermetic sealing of such packages is greatly facilitated by the use of thermoplastic materials which may be bonded together to form an air-tight seal by the application of heat and pressure thereto.

Packers have encountered several problems in producing vacuum sealed packages in large quantities with presently available vacuum bag sealing machines. These machines generally require that an operator place the product in the bag and place the bag in the vacuum sealing machine. In some cases the operator also has to actuate the machine to evacuate and seal the bag and then remove the sealed bag from the machine. This manual handling of the product requires a great number of operators and much plant space. Economic factors dictate the use of automatic bag-sealing equipment.

The present invention contemplates the use of prefabricated bags or pouches. Manual filling of the packages with the product would partially defeat the purpose of automatic equipment and it is therefore desired to use the machine of the present invention in conjunction with automatic bagging machines such as those disclosed in my co-pending applications Serial No. 744,975 filed July 27, 1958, now Patent No. 2,973,610, and entitled Bag Filling Machine, and Serial No. 758,399 filed Sept. 2, 1958, now Patent No. 2,986,858, and entitled Bagging and Packaging Machine. The present apparatus is adapted to receive a continuous flow of the bagged product, and thereafter to evacuate, seal and discharge the vacuum sealed package automatically and without attention from an operator.

Accordingly it is a principal object of the present invention to provide a machine for vacuum sealing bags and pouches which is responsive to the entry of a bagged product into the machine to start an operative cycle during which the machine will automatically evacuate, seal and discharge the package.

Another object of the present invention is to provide a machine for vacuum sealing bags which incorporates novel provisions for rapidly attaining an evacuated environment surrounding the bag so as to greatly speed up the evacuating process and which will thereafter rapidly seal and eject the bag from the machine.

A further object of the present invention is to provide an automatic vacuum bag sealing machine which is entirely mechanically operated through a novel combination of pneumatic and mechanical devices so as to eliminate electrical components which often malfunction under the cold and damp conditions encountered in the vacuum packaging of meat products and the like.

A still further object of the present invention is to provide a machine of the character described which is adapted to receive the bagged product in haphazard alignment and thereafter to automatically orient and align the bagged product with respect to its direction of travel through the machine.

Yet another object of the present invention is to provide a vacuum bag sealing machine of the character described incorporating novel apparatus for accomplishing a perfect seal through the elimination of wrinkles and creases during the sealing process.

Another object of the invention is to provide a machine of the character described which will produce a product of pleasing appearance due to a novel flattening and forming action accomplished by the machine.

Yet another object of the invention is to provide a machine for vacuum sealing bags which is sturdy, easy to clean and service, and which requires the minimum of attention during its operating life.

Other objects and advantages will become apparent from the following description and the accompanying drawings, and accordingly it is not desired to limit the scope of the invention except as defined in the attached claims.

In the drawings:
FIGURE 1 is a side elevational view of a machine for vacuum sealing bags constructed in accordance with the present invention;
FIGURE 2, a plan sectional view taken substantially on the plane of line 2—2 of FIGURE 1;
FIGURE 3, an enlarged fragmentary view taken substantially on the plane of line 3—3 of FIGURE 2;
FIGURE 4, an enlarged fragmentary detail view of a pair of bag actuating members forming part of the apparatus of FIGURE 1 and illustrating the bag engaging members in an initial contact position;
FIGURE 5, a view similar to the of FIGURE 4 but showing the bag engaging members in an intermediate position;
FIGURE 6, an enlarged fragmentary detail view similar to that of FIGURES 4 and 5 but illustrating the bag engaging members in a terminal position;
FIGURE 7, an enlarged longitudinal sectional view taken substantially on the plane of line 7—7 of FIGURE 2;
FIGURE 8, an enlarged plan sectional view of a control mechanism and taken substantially on the plane of line 8—8 of FIGURE 1;
FIGURE 9, an enlarged fragmentary detail view of a control actuating device, taken substantially on the plane of line 9—9 of FIGURE 1;
FIGURE 10, an enlarged fragmentary detail view taken substantially on the plane of line 10—10 of FIGURE 1;
FIGURE 11, a fragmentary plan view of a conveyor feed and flattening device employed in connection with the apparatus of FIGURE 1;
FIGURE 12, a side elevational view of the conveyor feed and flattening device of FIGURE 11;
FIGURE 13, a schematic view of the actuating and control system for the apparatus of FIGURE 1; and
FIGURE 14, an enlarged fragmentary detail view of a feeler-operated actuating device.

Referring to the accompanying drawing in detail, it will be seen that the machine for vacuum sealing bags of the present invention includes a housing having bottom and cover members 22 and 23, respectively, mounted for movement together and apart and formed to provide a sealed chamber when together, means 26 for moving the members to open and close the chamber, means 27 responsive to entry of a bagged product 28 between the members 22 and 23 for moving such members together, means 29 connected to the chamber 24 for evacuating some when the members are together, and means 31 for sealing the open end of the bag while the chamber is sealed.

The bottom housing member 21 is formed with a flattened area adapted to receive and support the bagged product 28 which is inserted between the members 21 and 22 from the left as viewed in FIGURE 7. Preferably, and as here shown, the bottom member 22 is substantially flat and is provided with rollers 30 so that the product may freely move to the required position and may easily be ejected from the chamber when sealed.

With such construction of the bottom member 22 the cover member is hollowed out to provide the chamber 24 when the two members are brought together. A hermetic seal is accomplished between the sections by a gasket 32 mounted in the upper face of the bottom member 22 for sealing engagement with the downwardly extending sidewalls of the cover member 23.

While it will be apparent that the cover member 23 could be fixed and the bottom member 22 reciprocate relative thereto, I prefer to mount the bottom member 22 on a frame 35 and reciprocate the cover member.

The means 26 for moving the bottom and cover members 22 and 23 together and apart here comprises a pneumatic cylinder 33 arranged to raise and lower the cover 23 with respect to the bottom member 22. This cylinder is here attached to the cover 23 by means of a piston rod 34 adjustably threaded into a boss 36 mounted on the cover, and is held in place by a lock nut 37.

The cylinder 33 is supported in spaced relation above the cover 23 on a plate 39 supported by posts 41 attached to plate 39 and to bosses 42 projecting from the lower bottom member 22. These posts 41 are also used to guide the cover member 23 in its movement toward and away from the bottom member 22, this being accomplished by means of bosses 43 which project from the cover member 23 and are slidably journaled on the posts 41.

The starting means 27 is responsive to entry of the bagged product 28 between the members 22 and 23 to start the evacuating and sealing cycle of the machine. As here shown, this means includes a starting element 46 mounted on the bottom member 22 for displacement by the bagged product, the starting element being connected to a control device 47 mounted outside the chamber and actuated by the displacement of the starting element 46.

As here shown, the element 46 consists of a bar mounted transversely of the chamber 24 upon a carriage-member 48 slidably supported in guideways 49 provided in the bottom member 22. Secured to the under side of the carriage member 48 is a rack gear 51 which is enmeshed with a rack pinion gear 52 secured to a shaft 53 journaled in the bottom member 22.

As here shown, a housing 54 may be secured to the under side of the member 22 to accommodate the rack pinion 52, maintaining the hermetic integrity of the bottom member.

Movement of the starting element 46 to the right will act through the gears 51 and 52 to rotate shaft 53 and actuate the control device 47 outside the chamber. To maintain the hermetic integrity of the chamber, a suitable vacuum seal (not shown) may be provided around the shaft 53.

The control device 47 may best be seen in FIGURE 3 of the drawings and as there shown includes a starting valve 56 having an actuating element 57 extending therefrom for displacement by a trip member 58 secured to shaft 53. Spring 59 is compressed between the distal end of trip member 58 and a boss 61 secured to bottom member 22. Entry of the bagged product 28 into the chamber exerts sufficient force on shaft 53, through the trigger element 46, to overcome the force of spring 59 and deflect the starting valve actuator 57. The forces involved are relatively slight and the starting valve 56 is easily tripped. In order to reduce friction between the parts, the lever arm from the shaft 53 to the actuator 57 should be comparatively small and I prefer to mount a ball-bearing roller 62 on the end of trip member 58 for contact with the actuator 57.

Different sizes of bagged products may be accommodated by the starting means 27. FIGURE 7 of the drawings illustrates the smallest size of bagged product just as it encounters the starting element 46 and begins to displace it to the right as viewed in this figure. Because of the short lever arm between shaft 53 and actuator 57, the starting element 46 need be displaced only a short distance to actuate the starting valve 56. Adjustment of the starting means 27 to accommodate larger sizes of bagged product is accomplished by releasing the trip member 58 from the shaft 53 and rotating such shaft by means of a knob 63 until the starting element 46 is in the corresponding position. This is achieved by the construction shown in FIGURE 3 wherein the trip member 58 is split into two sections which are releasably clamped on shaft 53 by a thumb screw 64. If desired, the knob 63 may be marked with suitable indices to permit its rapid adjustment to different sizes of bagged product.

Evacuation of the chamber 24 is accomplished by the means 29 which here includes a valving unit 66 formed for sequentially connecting the chamber to a vacuum receiver 67 and to the atmosphere. The valving unit 66 is controlled to connect the chamber 24 to the vacuum receiver 67 after the chamber is sealed. A timed interval thereafter the valving unit 66 will close off the connection to the vacuum receiver and will thereupon connect the chamber to the atmosphere.

The preferred construction of the valving unit 66 is schematically depicted in FIGURE 13 of the drawings and includes a vacuum valve 68, for connecting the vacuum conduit 69 to the chamber, and a vent valve 71 for connecting the chamber to the atmosphere.

Included in the valving unit assembly is actuator means for urging the vent valve 71 closed and the vacuum valve 68 open when air under pressure is supplied to the actuator means. Also included is spring means which tends to urge the vent valve 71 open and the vacuum valve 68 closed. Thus air pressure to the actuating means opposes the action of the spring means.

The actuator means includes a pneumatic cylinder 72 having a piston 73 connected to a rod 74 which is in turn connected to and actuates the vacuum valve 68. A suitable seal 76 is provided for separating the pneumatic cylinder from the valve chamber. Also included in the actuator means is a pneumatic cylinder 77 having a piston 78 secured to a rod 79 which is in turn secured to and operates the vent valve 71. A spring 81 mounted in cylinder 72 tends to urge the vacuum valve 68 against its seat, and a spring 82 in cylinder 77 tends to urge the vent valve 71 away from its seat.

The spring 81 is stronger than spring 82 in order to insure that the vent valve closes before the chamber 24 is connected to the vacuum receiver 67 and also to insure that the vacuum valve 68 closes before the vent valve 71 is opened, the opening of the vent valve being necessary to relieve the vacuum in the chamber 24 to permit the cover member 23 to be moved away from the bottom member 22.

When air under pressure is supplied to the valving unit 66 through conduits 83 and 84, and the relatively weak spring 82 will permit the vent valve 71 to be forced closed by the pressure exerted on piston 78 before similar pressure exerted on piston 73 rises high enough to compress spring 81. When air pressure is vented from conduits 83 and 84, the air pressure in cylinders 72 and 77 will begin to drop. The spring 82 preferably is just strong enough to overcome the force of atmospheric pressure which still tends to hold the vent valve 71 closed when the pressure in cylinder 77 fails to equilibrium with the outside atmospheric pressure. Thus, so long as pressure greater than atmospheric pressure remains in cylinder 77 the vent valve 71 will remain closed.

Spring 81 preferably is considerably stronger than spring 82 and will act to close vacuum valve 68 even when some air pressure remains in cylinder 72. Convenient adjustment of the relative bias of the springs 81 and 82 is accomplished by controlling the amount of compression exerted on spring 81 by means of a traveling spring seat 86 actuated by a screw 87 projecting through the end of cylinder 72. This adjustment permits the operator to select the time interval between the opening of one of the valves 68 or 71 and in closing of the other.

Once the chamber 24 is evacuated, the sealing means 31 becomes active to seal the open end of the bag. The sealing means may best be seen in FIGURES 2 and 7 of the drawings, and as shown therein, includes an elongated heating element 92 and a cooperative anvil 93 movable toward each other for effecting a heat seal across the open end 91 of the bag.

Preferably, and as here shown, the heating element 92 is mounted in fixed relation to the cover member 23 for movement therewith. As may be seen in FIGURE 7, the heating element 92 is preferably of T shape and extends to the outside of the cover member. This permits easy connection of the wires 94 which provide electrical energy to the heating element. Insulation between the heating element 92 and the cover member 23 is provided by an intermediate mounting bar 96 of porcelain or other suitable thermal insulating material, which is secured to the heating element 92 by means of screws 97 and is also secured to the cover member 23 by screws 98.

The open end 91 of the bag is pressed against the heating element 92 by the anvil 93 which is mounted for vertical reciprocation in the bottom member 22 for this purpose. As may be seen in FIGURE 7, the anvil 93 is mounted on a rod 101 which passes downwardly through a vacuum seal 102, the rod 101 comprising the piston rod of a pneumatic cylinder 103 mounted on the under side of the bottom member 22. When cylinder 103 is activated by supplying air under pressure thereto, the rod 101 will displace the anvil 93 upwardly to clamp the open end 91 of the bag between the sealing edge 104 of the heating element and the confronting edge of the anvil.

As a feature of the present invention the sealing edge 104 is of substantially parabolic form, that is, it has a rounded nose facing downwardly and the portions adjacent to the nose sweep smoothly upwardly therefrom. A resilient pad 106 is mounted in the upper edge of the anvil 93 and, when pressed firmly against the sealing edge 104, conforms thereto. The bag end clamped between sealing edge 104 and pad 106 is thus pressed into a shallow groove running the width of the bag. This aids in avoiding wrinkles and creases and provides a much improved seal, and this results in a remarkably small number of rejects because of imperfect seals.

In accordance with the present invention and as an important feature thereof, dewrinkling means 111 is provided for smoothly spreading the open end 91 of the bag so as to reduce the possibility of forming creases in the bag at the seal which could result in leaking. The means 111 operates in response to the movement of the bottom and cover members 22 and 23 toward each other, so as to accomplish its dewrinkling action before the anvil 93 presses the bag against the heating element 92.

The means 111 includes a pair of oppositely curved bag engaging members 112 carried in spaced relation on the cover member 23 and a similar pair of bag engaging members 113 carried on the bottom member 22 in confronting relation to the members 112. The bag engaging members 112 and 113 are pivoted on the cover and bottom members for lateral swinging movement whereby the confronting curved portions 114 of the bag engaging members will roll against each other as they are urged together. With this action, the members 112 and 113 will grip the open end 91 of the bag therebetween progressively inward from outside the side edges of the bag and with an outward component of movement adapted to smoothly spread and dewrinkle the bag end 91.

The bag engaging members 112 and 113 are pivoted on pins 116 adjacent to the inner end 117 of the curved faces 114. Torsion springs 118 are mounted on the pins 116 and are biased to urge the bag engaging member toward the confronting bag engaging member.

The geometric relation of the pins 116 to the curved faces 114 is such that the faces 114 will contact each other outwardly of the side edges 119 of the bag and will then roll against each other as the bag engaging members are moved together.

The result of this action is depicted in FIGURES 4 through 6 of the accompanying drawings. These figures illustrate the bag engaging members at one side of the bag and it should be clearly understood that the equivalent bag engaging members at the opposite side of the bag are similar but reversed. Therefore it is believed that illustration of the bag engaging member construction at one side of the bag will suffice to illustrate the entire assembly.

FIGURE 4 illustrates the bag engaging members 112 and 113 as they make their initial contact with each other. It should be noted that this contact is considerably outside the outer edge 119 of the bag. FIGURE 5 illustrates the bag engaging members in the position they assume as they approach closer together and in which the members are just rolling onto the edge of the bag. FIGURE 6 illustrates the bag engaging members in the position they assume during the actual sealing of the bag. As may be seen from these views, the gripping action exerted on the bag by the bag engaging members 112 and 113 tends to pull the edges of the bag outwardly beginning with the extreme edge. This results in a novel, smooth spreading action of the bag end and holds the bag in smoothed condition so that the sealing means can effect a perfect hermetic seal in each instance. It should be appreciated that the machine operates very rapidly and the described action of the bag engaging members 112 and 113 accomplishes the smooth dewrinkling action automatically and with much more certainty than lies within the capabilities of other bag spreading means.

As a feature of the present invention the pairs of bag engaging members 112 and 113 are also mounted for resiliently opposed swinging movement toward the bagged product whereby the bag engaging members may maintain gripping contact with areas of the bag which may move toward the product when the bag sides are urged together. Under normal conditions this swinging movement is not too essential, but when a particularly thick product and a relatively short bag end are encountered, the bag engaging members must be able to move toward the product or stress wrinkles will be formed in the bag end due to stretching action on the bag. To provide for such movement the bag engaging members 112 and 113 are here attached to block members 121 and 122 by means of the pins 116. The block members 121 and 122 are carried on transfer shafts 123 and 124, respectively. Shaft 123 is journaled in bosses 126 attached to cover member 23. The shaft 124 is journaled in a pair of bosses 127 extending from the anvil attached to and extending from the anvil 93. Torsion springs 128 are mounted around shafts 123 and 124 and are biased to swing the blocks 121 and 122 toward the heating element and anvil, respectively. Stop members 131 and 132 are provided on the heating element 92 and anvil 93, respectively, for limiting the approach of the bag engaging members 112 and 113.

Means 136 is provided for ejecting the vacuum sealed bag from between the bottom and cover members 22 and 23 as soon as these members move apart. This means includes a pusher bar 137 mounted on the piston rod of a pneumatic cylinder 138 and urged thereby transversely across the bottom plate 22 so as to engage and push the vacuum sealed bag sideways from between cover member 23 and bottom member 22.

Means is also provided for holding the bagged product down on member 22 during the bag sealing operation. This means here includes a plate 139 pressed downwardly by a spring 140 so that the plate will contact the bagged product as the cover 23 descends and hold it securely during the operation of the dewrinkling means 111 and bag sealing means 31. The plate 139 also tends to flatten and shape the product to provide a more attractive package. As the cover member 23 rises, the plate pushes down on the product and prevents it from being sucked upwardly by the upward movement of the cover, thus maintaining the bag in correct position for engagement by the pusher bar 137.

As an important feature of the present invention control means 141 is provided for actuating the chamber opening and closing means 26, the evacuating means 29, the sealing means 31 and the ejecting means 136 one after the other, so that these means will operate sequentially to move the members 22 and 23 together to provide the sealed chamber 24, then evacuate the air from the chamber, then seal the open end of the bag, then admit atmosphere to the chamber, then urge the members 22 and 23 apart, and thereafter eject the sealed bag from between the members.

In accordance with the present invention, the entire control and operating system is mechanical in nature so as to eliminate electrical or electronic components. To this end, and as heretofore described, the operating devices are actuated by compressed air. The control means 141 controls the supply of compressed air to the operating devices in the correct sequence and for the correct periods of time to accomplish the bagging operation. As here shown, the control means 141 includes a series of pneumatic valve sets 142a, 142b, 142c, 142d and 142e which are actuated by a series of cams 143a, 143b, 143c, 143d, 143e, respectively.

The cams 143a–e are all mounted on a common cam shaft 144 and are formed so that one complete rotation of shaft 144 will operate the valves 142a–e in the correct sequence and for the correct durations. A typical valve set 142 and the cam-operated actuating means therefor are illustrated in FIGURE 10 of the drawings. As there shown, an arm is pivoted at 147 to a subframe 148 which also carries the valve set 142. A spring 149 urges a medial portion of the bar 146 against a typical cam 143 mounted on cam shaft 144. When the lobe of the cam encounters the bar 146 it displaces the bar downwardly and accordingly displaces an actuator rod 151 for a valve 152 forming part of the valve set 142. When the end of the lobe is reached, the bar 148 is permitted to move upwardly under the influence of spring 149 to depress the actuator rod 153 of a valve 154 mounted in opposed relation to valve 152.

Rotation of the cam shaft 144 is effected by a pneumatic cylinder 156, having a piston rod 157 upon which is mounted a rack gear 158 enmeshed with a rack pinion gear 159 carried on shaft 144. Journaled on shaft 144 is a flange 161 having a bushing 162 extending therefrom upon which the gear 159 is secured. A ratchet device 163 is provided between the member 161 and shaft 144 and is formed so that a stroke of the piston rod 157 to the left as viewed in FIGURE 9 will rotate the shaft 144 through a full 360 degrees, but the ratchet device 163 will release and permit the shaft 144 to remain still as the rod 157 accomplishes its return stroke. The ratchet device 163 includes a toothed wheel 164 secured to shaft 144 and a pawl 166 cooperative with wheel 164 and pivotally mounted on member 161. A similar ratchet device 163a is provided at the other end of the shaft and serves to prevent the shaft from rotating in the reverse direction during the return stroke of the piston rod 157.

Actuation of the pneumatic cylinder 156 is initiated by the starting valve 56 which is connected by conduit 167 to a compressed air supply conduit 168 and is also connected by a conduit 169 to an actuating valve 171 for the cylinder 156.

The valve 171 is typical of the air valves utilized in the present apparatus and comprises a modified D valve having a valve member 172 reciprocable in a valve chamber 173 to cover and uncover suitable valve ports. Reciprocation of the valve member 172 is accomplished by an actuator rod 174 extending from the valve body. The valve 171 is provided with a pneumatic actuating cylinder 176 having piston 177 connected to the actuating rod 174.

When starting valve 56 supplies air to conduit 169 in response to the bagged product entering upon the bottom member 22, the D valve member 172 will be displaced to the right as viewed in FIGURE 13. This will connect a conduit 178 leading to the rear end of cylinder 156 to the compressed air supply conduit 168 through a conduit 179. This will cause the piston rod 157 to extend and rotate the cam shaft 144. Control over the speed of rotation of the cam shaft is provided by inserting a check valve 181 in conduit 178 and providing a by-pass 182 incorporating a needle valve 183 for controlling the amount of air fed to the rear end of cylinder 156.

When the piston rod 157 approaches the limits of its extension from cylinder 156 it will engage and actuate a valve 184 which serves to vent the compressed air in cylinder 176 to the atmosphere. This allows a spring 186 to return the D valve 172 to the position shown in FIGURE 13, connecting the front end of cylinder 156 to the source of compressed air, and venting the rear end of the cylinder 156 to the atmosphere, thus causing a quick return stroke of the piston rod 157.

As the cam shaft 144 rotates, cam 143a will first operate valve set 142a to supply air through conduit 187 to the upper end of the cylinder 33, moving cover member 23 downwardly against bottom member 22. Air is supplied directly to the upper end of cylinder 33 bypass for rapidly closing the cover. A by-pass arrangement 188 similar to that employed in conduit 178 is mounted in conduit 187 for cushioning the return stroke of the piston.

Continued rotation of cam shaft 144 will operate valve set 142b to provide compressed air through a conduit 189 to the conduits 83 and 84 leading to the valving unit 66. This will operate valving unit 66 in the previously described manner to evacuate the chamber 24.

Continued rotation of the cam shaft 144 will operate valve set 142c to provide compressed air through a conduit 191 to the cylinder 103, which will result in the sealing of the bag.

As the cam shaft 144 continues to rotate, valve set 142d will be actuated to supply compressed air through a conduit 192 to the lower end of the cylinder 33. Just before this occurs the cam 143a will permit valve set 142a to return to its original condition and vent the upper end of cylinder 33 to the atmosphere. The pressure in the lower end of the cylinder 33 will then lift the cover member 23 away from the bottom member 22, it being noted that the valving unit 66 will have been adjusted to vent the chamber 24 to the atmosphere in time to permit the cylinder 33 to open the chamber.

The final few degrees of rotation of the cam shaft 144 will actuate valve set 142e and supply air through a conduit 193 to the rear end of the ejector cylinder 138, causing the ejector to push the sealed bag from the bottom member 22. A check valve and by-pass unit 194 similar to unit 188 is provided in conduit 193 to regulate the speed at which the ejector operates. As soon as the piston rod 157 actuates the valve 184 to supply air to the front end of cylinder 156, the pusher bar 137 will be retracted. This is accomplished by a conduit 196 connected between the front end of the cylinder 138 and the front end of cylinder 156, it being noted that the return stroke of the rod 157 will cause the valve set 142 to be reversed, venting the rear end of cylinder 138 to the atmosphere.

Incorporated in the present machine is a means 201 for feeding the bagged product onto the bottom member 22 for vacuum sealing. The feed means 201 includes devices for aligning the bagged product relative to the chamber 24 prior to its entry thereinto and for regulating the rate of speed of the bagged product as it enters the chamber.

The device for aligning the bag here comprises an inclined plate 202 extending from the deliver end of a belt conveyor 203 to the bottom housing member 22 for transporting the bagged product therebetween in one-at-a-time order. Carried by plate 202 are a pair of upstanding walls 204 and 206 extending in spaced relation down the plate and formed for aligning the bag with its direction of travel for entry into the chamber in properly aligned condition. As may be seen in FIGURE 2 of the drawings, the walls 204 and 206 are parallel and are adjustable as to spacing in order to accommodate various widths of bags. The spacing is adjusted by loosening thumb screws 207 which are engaged through laterally extending slots 208 formed in tabs 209 which project laterally outwardly from the walls 204 and 206.

As a feature of the invention the plate 202 is formed with a plurality of perforations 211 through which jets of air are directed upwardly in order to float the bagged product over the plate. An elongated box-shaped manifold chamber 210 is formed beneath plate 202 and is supplied with air from any suitable source such as a blower 215. The streams of air passing through openings 211 form a pressurized layer of air under the bagged product and the air passes up between the side edges of the bag and the walls and holds the bag away from the walls so that the bag never actually contacts either the plate or the walls. The aligning of the bag is accomplished during its progress down the plate and for this purpose the upper ends of the walls are cut off substantially on the plane of the upper belt of the conveyor 203. Thus a bagged product which is misaligned on the belt will pass into the feed means 201 with a portion of the bag riding on the wall. The action of the air jets under the product will cause it to swerve and align itself with the direction of travel.

It is important that the bagged product pass onto the bottom member 22 at as moderate a speed as possible in order to avoid misalignment of the bag when it strikes the starting element 46 and to avoid excessive jarring action on the starting element. For this purpose a stop gate 212 is mounted over the plate 202 in position to intercept and momentarily halt the bagged product. The stop gate 212 will then release the product and allow it to pass onto the bottom member 22 at a desired rate of speed.

Means 213 responsive to the presence of the bagged product at the stop gate is provided for raising the latter so as to permit the bagged product to pass onto the bottom member 22. This means includes a pneumatic actuator cylinder 214 having a piston rod 216 connected to the stop gate and formed for urging the latter downwardly when the cylinder 214 is supplied with air under pressure. As may best be seen from FIGURE 13 of the drawings, compressed air is supplied through a conduit 217 to the upper end of the cylinder 214, and a spring 218 is mounted in the lower end of the cylinder and biased to lift the stop gate 212 when the air pressure in the upper end of cylinder 214 falls below a predetermined point.

The amount of air pressure in the upper end of cylinder 214 is controlled by a valve 219 which is adapted to vent the air from the cylinder 214 when actuated. This is made possible by the provision of a needle valve 221 in conduit 217 which permits the compressed air to bleed past the valve 221 and into the cylinder 214.

When valve 219 is actuated to vent the cylinder 214 to atmosphere, the pressure in the cylinder will drop quickly and allow the spring 218 to lift the stop gate and permit the bagged product to proceed into the chamber 22.

The control valve 219 is provided with an actuating device 222 having a feeler 223 hanging down in the path of the bagged article just above the stop gate 212. Displacement of the feeler 223, to the right as viewed in FIGURE 1, by the bagged article serves to trip the valve 219 and dump the air from cylinder 214.

FIGURE 14 illustrates the actuator device 222, which consists, essentially, of a cam 224 journaled on an eccentric pin 226 carried by the housing 227 of valve 219. Displacement of the feeler 223 to the right will rotate the eccentric cam 224 and cause it to displace the actuating rod 228 of the control valve 219.

The feeler 223 will be displaced to the right so long as it is engaged by the bagged product and it will be noted that the parts are positioned so that the feeler will be displaced by the bagged product long enough to prevent the stop gate from dropping onto the product as control valve 19 is closed and air pressure builds up in cylinder 214.

In accordance with the present invention means 231 is provided for flattening and forming the product and for expelling excess air from the bag prior to its delivery from the conveyor 203 onto the feed means 201. The means 231 consists essentially of a softly resilient roller 232 riding on or just above the top of the conveyor belt 203 and cooperative with the conveyor belt to press or squeeze the excess air from the bag while at the same time flattening down and smoothing out the product.

The smoothing action helps form the product into units of uniform size and shape for facilitating the action of the bag evacuating and sealing devices.

The roller 232 is here shown as comprising a series of disks of a softly resilient material such as foam rubber carried on a shaft 233 journaled in the distal ends of a pair of elongated arms 234, the arms being pivoted ahead of the roller on a shaft 236 supported by upstanding bars 237 attached to the frame of the conveyor 203.

Preferably, and as here shown, a series of holes 238 are formed in the disks making up the roller 232 so that the roller may be made softer to avoid squashing softer products. The resiliency of the roller is controlled by a pair of circular disks 239 mounted on each side of the roller and secured to the shaft 233 by split rings 241. The rings 241 are threaded on shaft 233 and the roller may be made more firm by simply loosening the tightening screw 252 of the ring 241 and rotating the ring to urge the member 239 toward the similar member on the opposite side of the roller.

The roller should barely contact the belt 203 and an adjustment device 243 is provided to insure the positive entry of the bagged product under the roller and eliminate any tendency of the bag to slide on the conveyor. This device 243 is here shown as comprising a pair of vertical pins 244 threaded through a pair of clips 246 secured to opposite sides of the frame of the conveyor 203, the pins 244 being held in the desired position by lock nuts 247. The upper ends of the pins 244 support a transverse bar 248 secured to the arms 234.

While I have shown the roller 232 as being formed of foam rubber, it should be apparent that other softly resilient materials such as inflatable bags or soft bristle brushes could be employed.

The unique action of the flattening means 231 has at least three beneficial results in the action of the present machine. The product is formed and pressed firmly together so it will not slip around in the bag during its transit to the chamber 24, the excess air is pressed out of the bag so that the evacuation process may be speeded up, and the bagged product is pushed onto the feed means 201 in a manner somewhat analogous to clothes being pushed through a wringer. This positive action aids the air jets and the shape of the inclined plate 202 and sidewalls 204 and 206 in correctly aligning the bag with the remainder of the machine.

In order to adapt the present machine for use in a variety of installations, the frame 35 has been designed to permit tilting of the vacuum bag sealing portion of the machine to any desired pitch. This is accomplished by a trunnion 251 carried on a vertical post 252 and pivotally engaged with ears 253 depending from the bottom member 22. Vertical height adjustment is provided by threading the post 252 and providing lock nuts 254 and 256 thereon, which may be cinched up against a barrel 257 carried on triangularly arranged legs 258. The control means 141 may be conveniently carried on the frame 35 by means of the subframe 148 which may be secured directly to the frame 35.

In operation, the bagged product 28 is placed in a single row on conveyor 203 at a spacing correlated with the speed of the conveyor belt so that the bagged product will be fed into the machine of the present invention in one at a time order and spaced apart by a length of time sufficient for the machine to complete one cycle. The present machine is capable of speeds up to approximately 40 to 50 bags per minute and is particularly useful in connection with automatic packaging equipment such as that shown in my aforesaid co-pending application.

The bagged product 28 is carried beneath the flattening roller 232 and passes therefrom on to the feed means 201. As the bagged product passes over plate 202 it is supported by the streams of air issuing from openings 211 and is automatically aligned with respect to the chamber by the cooperative action of the air jets and the walls 204 and 206.

The bagged product passes downwardly over plate 202 until intercepted and halted by gate 212. As the product approaches the stopgate it will actuate control valve 219 to dump the air from cylinder 214 raising the stopgate and allowing the product to continue into the chamber at a moderate rate of speed.

The bag passes into the chamber 24 over rollers 30 until it strikes and displaces the starting bar 46. This actuates the starting valve 56 causing the cylinder 156 to rotate cam shaft 144 through 360 degrees. The cams 143 operate the valve sets 142 in sequence. This causes the cylinder 33 to quickly lower the cover member 23 on to the bottom member 22 then actuates the valving unit 66 to evacuate the air from the chamber 24.

In this connection it should be noted that the evacuation of the chamber is extremely rapid as compared to machines which connect the chamber directly to a vacuum pump. The machine of the present invention provides a vacuum receiver 67 which is in the nature of a large tank. This tank is maintained at a desired minus pressure by a suitable vacuum pump (not shown). The chamber 24 is made with as small volume as possible to accommodate the range of sizes of bagged product for which the machine is intended, and the vacuum receiver 67 is made with as large a volume as is practicable. The great difference in volume results in an extremely rapid evacuation of chamber 24 as soon as the vacuum valve 68 is opened. I have found in actual practice that the ratio between the volume of the receiver 67 and the volume of the chamber 24 should be at least 700 to 1 in order to obtain the desired result.

The cams 143 are formed and arranged so that as soon as vacuum is attained in chamber 24, the cylinder 103 will actuate the dewrinkling and sealing means to effect a hermetic seal across the open end of the bag.

The chamber 24 is then connected to atmosphere by the valve unit 66 and the cylinder 33 lifts the cover 23 back to its original position. The ejector cylinder 138 then operates to push the produce from between members 22 and 23 and retracts whereupon the machine is ready for the next cycle.

From the foregoing it will be seen that I have provided a novel and original machine for vacuum sealing bags which is entirely automatic in operation so as to eliminate any need for an operator to be in constant attendance and which operates at high speed to accommodate a constant stream of bagged product such as emanates from an automatic bagging machine.

I claim:

1. A machine for evacuating and sealing airtight bags, comprising a bottom member having an area adapted to receive and support a product encased in an open-ended bag, a cover member mounted for relative movement toward and away from said first member and formed to define a chamber therewith, means on said members for hermetically sealing said chamber when said members are together, means for moving said members together, means connected to said chamber for evacuating same when said members are together, spaced dewrinkling means carried by each of said members and movable toward each other in a plane intercepting the open end of a bag in said chamber, said dewrinkling means being first engageable with each other outwardly of the opposite side edges of said open end and, upon further movement toward each other, being progressively oppositely inwardly engageable with said open end for smoothly spreading the open end of the bag, and means for sealing the said open end of the bag while the same is so spread.

2. A machine for evacuating and sealing airtight bags, comprising a bottom member having an area adapted to receive and support a product encased in an open-ended bag, a cover member mounted for relative movement toward and away from said first member and formed to define a chamber therewith, means on said members for hermetically sealing said chamber when said members are together, means for moving said members together, means connected to said chamber for evacuating same when said members are together, dewrinkling means for said members formed for engaging and smoothly spreading the open end of the bag, and means for sealing the said open end of the bag while said chamber is sealed, said dewrinkling means including a first pair of oppositely curved bag engaging members carried in spaced relation on said cover member and a similar pair of bag engaging members carried on said bottom member in confronting, spaced relation to said first pair, means for moving said pairs of bag engaging members together, said bag engaging members being pivoted on said cover and bottom members for lateral swinging movement whereby the confronting curved portions of the bag engaging members roll against each other as they move together so as to grip the open end of the bag therebetween progressively inwardly from outside the side edges of the bag and with an outward component of movement adapted to smoothly spread and dewrinkle the bag end, said sealing means being operative to seal the bag end while the latter is smoothly spread by said bag engaging members.

3. A machine as described in claim 2 and wherein said pairs of bag engaging members are spring biased toward the opposing pairs.

4. A machine as described in claim 3 and wherein said pairs of bag engaging members are also mounted for resiliently opposed swinging movement toward the bagged product whereby said bag engaging members maintain gripping contact with the engaged areas of the bag which move toward the product when the bag sides are urged together.

5. A machine for vacuum sealing air-tight bags, comprising a housing having bottom and cover members movable together and apart and formed to provide a sealed chamber when together, means for moving said members to open and close the chamber, feed means synchronized with opening movement of the members for conveying a product encased in an open-ended bag into said chamber, said feed means including means for aligning the bagged product relative to said chamber prior to its entry thereinto and for regulating the rate of speed of the bagged product as it enters the chamber, and means responsive to the entrance of the bagged product into said chamber for vacuum sealing the bag.

6. A machine for vacuum sealing air-tight bags, comprising a housing having bottom and cover members movable together and apart and formed to provide a sealed chamber when together, means for moving said members to open and close the chamber, conveyor means formed to transport and deliver a product encased in an open-ended bag, an inclined plate extending from the delivery end of said conveyor means to said housing for transporting the bagged product therebetween in one at a time order, upstanding walls extending in spaced relation down said plate and formed for aligning the bag with the direction of travel for entry into said chamber, and means responsive to the entrance of the bagged product into said member for vacuum sealing the bag.

7. A machine for vacuum sealing air-tight bags, comprising a housing having bottom and cover members movable together and apart and formed to provide a sealed chamber when together, means for moving said members to open and close the chamber, conveyor means formed to transport and deliver a product encased in an open-ended bag, an inclined plate extending from the delivery end of said conveyor means to said housing for transporting the bagged product therebetween in one at a time order, upstanding walls extending in spaced relation down said plate and formed for aligning the bag with the direction of travel for entry into said chamber, a stopgate positioned to intercept and halt the bagged product on said plate, means responsive to the presence of the bagged product at said gate for raising the latter so as to permit the bagged product to pass into the chamber at a controlled rate of speed, and means responsive to the entrance of the bagged product into said chamber for vacuum sealing the bag.

8. A machine for vacuum sealing air-tight bags, comprising a housing having bottom and cover members movable together and apart and formed to provide a sealed chamber when together, means for moving said members to open and close the chamber, conveyor means formed to transport and deliver a product encased in an open-ended bag, an inclined plate extending from the delivery end of said conveyor means to said housing for transporting the bagged product therebetween in one at a time order, upstanding walls extending in spaced relation down said plate and formed for aligning the bag with the direction of travel for entry into said chamber, a stopgate positioned to intercept and halt the bagged product on said plate, a pneumatic actuator adapted for connection to a source of air under pressure through a restricted orifice, said actuator being connected to said stopgate and formed for lowering the latter when supplied with air under pressure, a control valve adapted for venting the air from said pneumatic actuator, an actuating device for said control valve having a displaceable feeler positioned in the path of the bagged article superjacent to said stopgate so as to operate the control valve to vent the air under pressure from pneumatic actuator whenever a bagged product is halted by the stopgate, spring means tending to lift said stopgate when said air is vented from said pneumatic actuator whereby the bagged product will pass into the chamber at a controlled rate of speed, and means responsive to the entrance of the bagged product into said chamber for vacuum sealing the bag.

9. A machine as described in claim 8 and wherein said orifice and the vent in the control valve are provided with means for adjusting the size of their respective openings for controlling the speed of opening and closing of said stopgate.

10. In a vacuum bag sealing machine, means for eliminating wrinkles from an open end of a bag containing a produce preparatory to sealing, comprising a heating element having an elongated sealing edge, an anvil mounted for relative movement toward and away from said sealing edge, pair of bag engaging members mounted for joint movement with said heating element and anvil for clamping engagement against the bag end, each of said bag engaging members having a curved face confronting the similar face on the cooperating bag engaging member, pivots for said bag engaging members adjacent to the inner end of the curved face, and springs urging the bag engaging members toward the confronting members past the confronting edges of said anvil and heating element whereby said curved faces will contact each other outwardly of the side edges of the bag and will then roll against each other as the anvil and heating elements move together so as to grip and smoothly spread the bag end from the side edges inwardly to eliminate wrinkles.

11. A machine for evacuating and sealing air-tight bags, comprising a bottom member having an area adapted to receive and support a product encased in an open-ended bag, a cover member mounted for relative movement toward and away from said first member and formed to define a chamber therewith, means on said members for hermetically sealing said chamber when said members are together, means for moving said members together, means connected to said chamber for evacuating same when said members are together, and means for sealing the open end of the bag while said chamber is sealed, said sealing means including an elongated heating element and an elongated anvil each carried by one of said members in spaced relation when said members are together and mounted for movement toward each other, said element and said anvil being engageable in a plane spaced above and parallel to said area of said bottom member, means for urging said element and said anvil into sealing engagement with the open end of a bag in said plane, dewrinkling means carried by said element and said anvil and spaced apart by a lesser distance than said element and said anvil for engaging the open end of a bag in said plane prior to engagement thereof by said element and said anvil.

References Cited by the Examiner

UNITED STATES PATENTS

| | | | |
|---|---|---|---|
| 965,336 | 7/10 | Schmidt et al. | 100—153 |
| 1,653,991 | 12/27 | Davis | 100—153 |
| 1,998,382 | 4/35 | Neff | 53—252 |
| 2,676,440 | 4/54 | Campbell | 53—86 X |
| 2,778,177 | 1/57 | Mahaffy et al. | 53—86 |
| 2,808,690 | 10/57 | Mahaffy et al. | 53—86 |
| 2,833,096 | 5/58 | Randall | 53—86 |
| 2,850,856 | 9/58 | Mosse | 53—89 |
| 2,924,924 | 2/60 | Garapolo et al. | 53—112 |
| 2,935,828 | 5/60 | Mahaffy et al. | 53—112 |
| 3,012,387 | 12/61 | Jacobs et al. | 53—373 X |
| 3,059,389 | 10/62 | Randall | 53—112 X |

FRANK E. BAILEY, *Primary Examiner.*

ROBERT A. LEIGHEY, *Examiner.*